United States Patent [19]
Morash et al.

[11] Patent Number: 5,711,348
[45] Date of Patent: Jan. 27, 1998

[54] HOT GAS CONTROL VALVE

[75] Inventors: Douglas H. Morash, Elma, N.Y.; Hans G. Toews, East Aurora, N.Y.

[73] Assignee: Moog Inc., East Aurora, N.Y.

[21] Appl. No.: 696,612

[22] Filed: Aug. 14, 1996

[51] Int. Cl.[6] ............................................. F16K 11/076
[52] U.S. Cl. ..................... 137/875; 137/625.45; 251/118
[58] Field of Search ................................. 137/864, 872, 137/875, 625.3, 625.44, 625.45, 625.46; 251/118

[56] References Cited

U.S. PATENT DOCUMENTS

| | | | |
|---|---|---|---|
| 2,752,945 | 7/1956 | Patterson et al. | 137/625.45 X |
| 3,365,165 | 1/1968 | Aire | 251/118 |
| 3,545,470 | 12/1970 | Paton | 137/875 X |

*Primary Examiner*—John Fox
*Attorney, Agent, or Firm*—Phillips, Lytle, Hitchcock, Blaine & Huber

[57] ABSTRACT

The present invention provides an improved hot gas control valve (20) which is adapted to apportion a gas flow, such as that issuing from a solid propellent gas generator, among a plurality of outlets communicating with rocket thruster nozzles (36). The improved valve has a body (21) and a valve member (22). The body has an inlet (24) communicating with an internal cavity. The cavity is partially bounded by a partially-spherical concave surface (32). The body has a plurality of outlet passages terminating in ports at the concave body surface. The valve member is operatively arranged within the cavity for omni-directional pivotal movement therewithin. The valve member has a surface (40) sealingly engaging the body concave surface and terminating in an edge (41). This valve member edge cooperates with the body ports to form variable-area metering orifices (A, B, C and D) therebetween. These orifices are so configured and arranged as to vary the areas of the orifices as a function of the angular position of the valve member relative to the body such that sum of the individual open areas of the metering orifices is substantially independent of valve member position over an operating range of valve member movement relative to the body.

10 Claims, 3 Drawing Sheets

5,711,348

HOT GAS CONTROL VALVE

TECHNICAL FIELD

The present invention relates generally to the field of jet-powered thrusters for changing the attitude of a vehicle, and, more particularly, to an improved hot gas control valve that is adapted to selectively apportion a gas flow from a solid propellant gas generator among a plurality of outlets severally communicating with rocket thruster nozzles in such a way that the total flow through the various nozzles remains substantially constant.

BACKGROUND ART

In rockets, missiles and spacecraft, it is common to have at least one rocket engine arranged to provide thrust to propel the vehicle forwardly. In some instances, steering is accomplished by means of airfoil surfaces (e.g., fins, ailerons, rudder, etc.) mounted on the body of the vehicle. In other cases, the attitude of the vehicle is controlled by means of gas reaction jets discharged laterally of the vehicle's direction of travel through thruster nozzles. These are usually arranged at various circumferentially-spaced locations about the vehicle body. In a typical arrangement, four radially-disposed thruster nozzles are provided, with the axis of each being arranged at an angle of 90° with respect to that of its immediate neighbors.

In some cases, the fluid to be discharged through the nozzles is created by a solid propellant gas generator. This generator may remain in an inactive or standby mode for a long period of time. However, once energized, it will continuously produce hot gas over its burn time, and that gas will have to be continuously discharged through one or more of the thruster nozzles. The generated gas is typically discharged through opposed pairs of such nozzles. If the nozzles of a cooperative pair are structurally identical and diametrically opposite, then fluid will be discharged therethrough as opposed jets. If the thrusts of such opposed jets are equal, then there will be no net lateral disturbing force exerted on the vehicle. On the other hand, if the opposed jets are unequal, then such jets will exert a net force on the vehicle.

It is, of course, possible to control the flows discharged through each nozzle by means of individual valves, but this is thought to be both expensive and inefficient.

Accordingly, it would be generally desirable to provide an improved control valve that is particularly adapted to apportion a gas flow (e.g., issuing from a solid propellant gas generator) among a plurality of outlets severally communicating with thruster nozzles. Such an improved valve should desirably be inexpensive to manufacture and operate, but without substantial sacrifice of function, feature or performance.

DISCLOSURE OF THE INVENTION

With parenthetical reference to the corresponding parts, portions or surfaces of the disclosed embodiment, merely for purposes of illustration and not by way of limitation, the present invention broadly provides an improved hot gas control valve that is adapted to apportion a gas flow (e.g., issuing from a solid propellant gas generator) among a plurality of outlets that severally communicate with rocket thruster nozzles.

The improved valve broadly comprises: a body having an inlet communicating with an internal cavity, this cavity being partially bounded by a partially-spherical concave surface, the body having a plurality of outlet passages terminating in ports at the concave surface; a valve member operatively arranged within the cavity for omni-directional pivotal movement therewithin, the valve member having a surface sealingly engaging the body concave surface and terminating in an edge, this edge cooperating with the ports to form variable-area metering orifices therebetween and being so configured and arranged as to vary the areas of the orifices as a function of the angular position of the valve member relative to the body such that the sum of the individual open areas of the metering orifices is substantially independent of valve member position over an operating range of valve member movement relative to the body.

In the preferred embodiment, the ports have metering edges arranged in a common plane, and the ports are circumferentially spaced from one another by equal interim distances. The common plane is perpendicular to a reference axis including the point about which the concave surface is generated. The ports are arranged in at least one cooperative pair, and the ports may be identical and are arranged at locations diametrically opposite one another. The sum of the open areas of the metering orifices of the cooperative pair remains substantially constant during the range of movement.

The valve may further include actuator means acting between the body and at least one eccentric point on the valve member for selectively moving the valve member relative to the body. This actuator means may include a lever mounted fast to the valve member and extending outwardly therefrom, a first actuator operatively arranged to act between the body and lever for causing the valve member to have a component of rotation in a tint plane relative to the body, and a second actuator operatively arranged to act between the body and lever for causing the valve member to have a component of rotation in a second plane relative to the body, with the first and second planes being perpendicular to one another. A flow diverter may be mounted on the valve member and operatively arranged to divert gas flow from the inlet toward the metering ports. In the preferred embodiment, the valve member is semi-spherical, and the valve member surface is partially-spherical and convex.

Accordingly, the general object of the invention is to provide an improved hot gas control valve.

Another object is to provide an improved hot gas control valve that is adapted to apportion a gas flow from a solid propellant gas generator among a plurality of outlets communicating with rocket thruster nozzles.

Another object is to provide an improved hot gas control valve having a common valve member mounted for omni-directional pivotal movement within a body cavity to vary the open orifice areas of passageways leading to the rocket nozzles in such a way that the total flow through the valve remains substantially constant.

These and other objects and advantages will become apparent from the foregoing and ongoing written specification, the drawings, and the appended claims.

MODE(S) OF CARRYING OUT THE INVENTION

Figure 3:
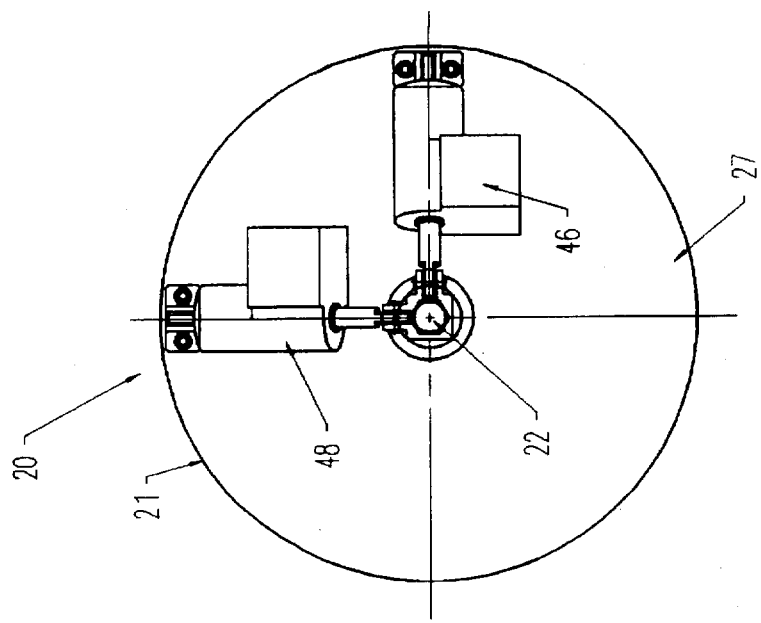
FIG. 3 is a rear elevation of the improved control valve shown in FIG. 2.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

Referring to the drawings, and, more particularly, to FIGS. 1–5 thereof, the present invention broadly provides an improved hot gas control valve, generally indicated at 20, that is adapted to apportion a hot gas flow, such as issuing from a solid propellant gas generator (not shown), among a plurality of outlets communicating with rocket thruster nozzles.

Figure 2:
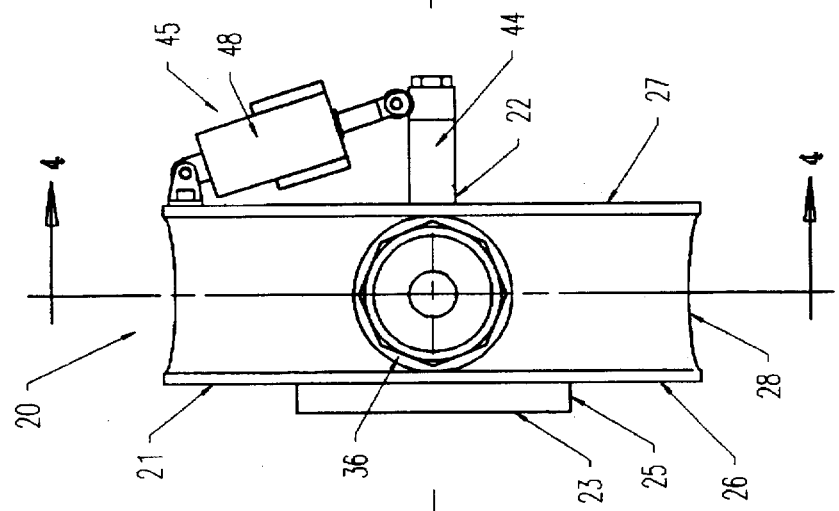
FIG. 2 is a right side elevation of the improved control valve shown in FIG. 1.
Figure 1:
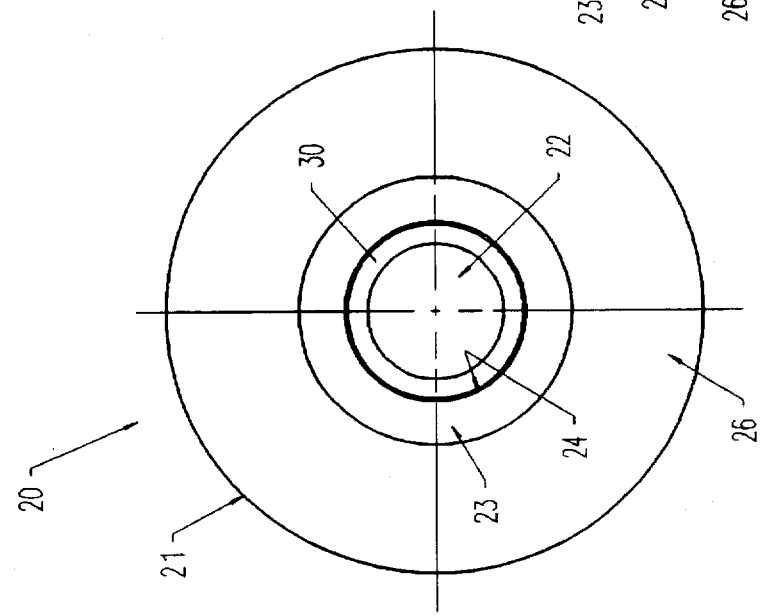
FIG. 1 is front elevation of a presently-preferred form of the improved hot gas control valve.
Figure 5:
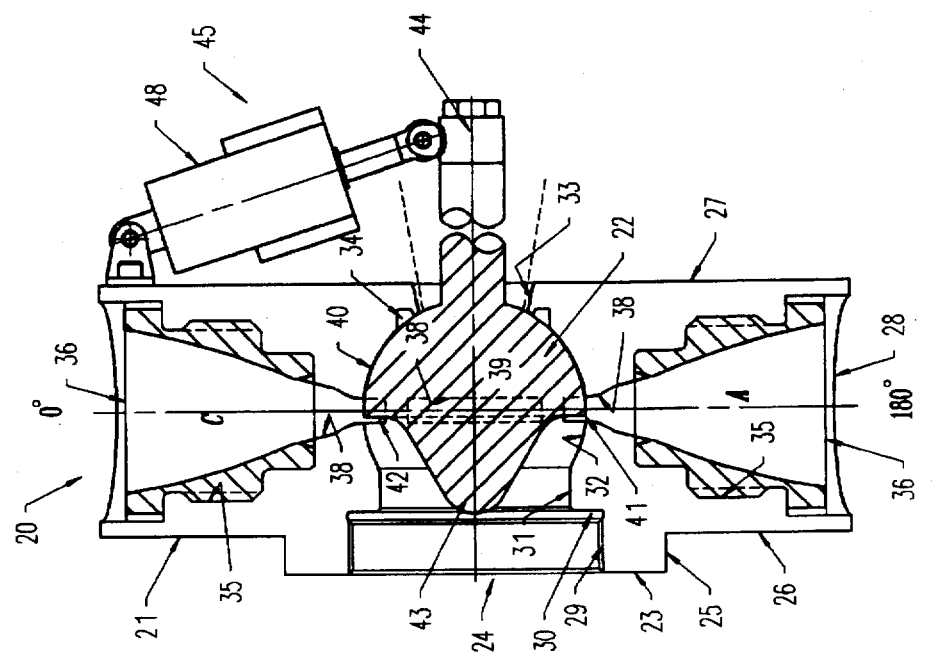
FIG. 5 is a fragmentary longitudinal vertical view thereof, partly in section and partly in elevation, taken generally on line 5—5 of FIG. 4, showing the semi-spherical valve member and the outlets communicating with the nozzles.
Figure 4:
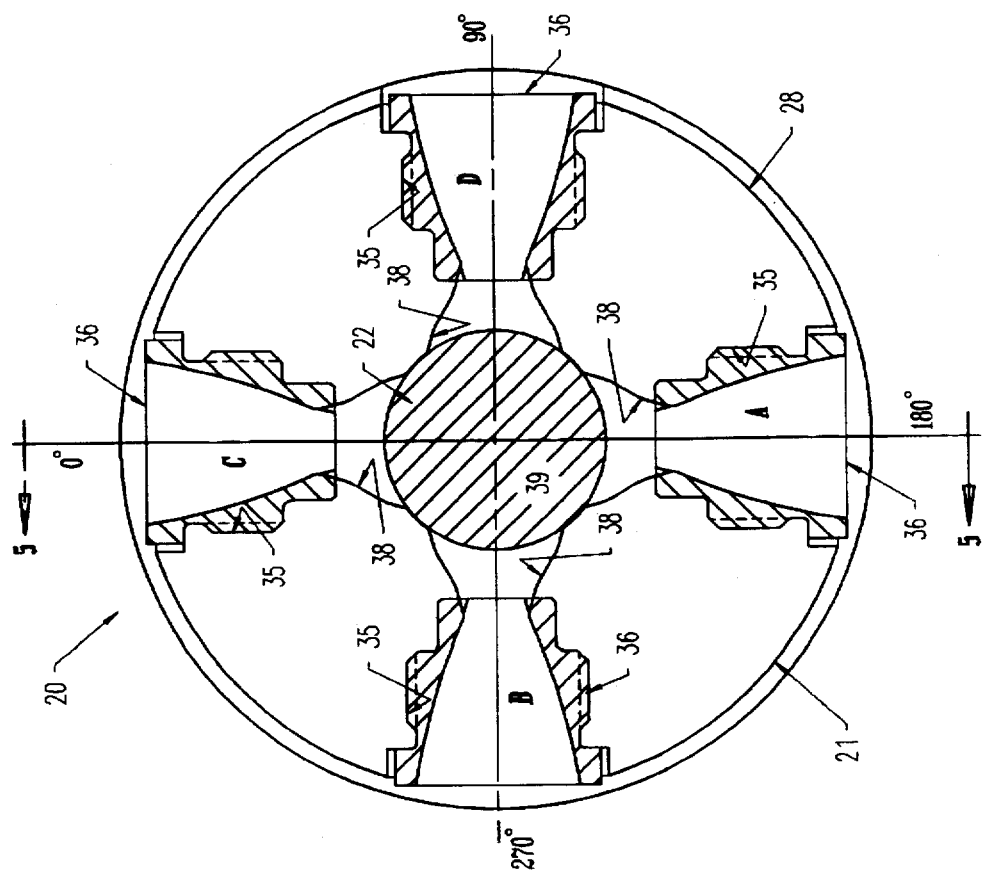
FIG. 4 is a fragmentary transverse vertical view thereof, partly in section and partly in elevation, taken generally on line 4—4 of FIG. 2, showing the valve member as being mounted for omni-directional pivotal movement within the body cavity to vary the metering orifices through which hot gas passes from the inlet to the thruster nozzles.

The improved valve is shown as broadly including a body, generally indicated at 21, having an internal cavity; and a joystick-like vane member, generally indicated at 22, having a portion operatively arranged within the body cavity for omni-directional pivotal movement relative thereto. In FIGS. 1–3, the body is shown in elevation. In FIGS. 4 and 5, the body is shown in cross-section. However, in these latter views, the body has not been cross-hatched to avoid obfuscation.

Body 21 is shown as being a horizontally-elongated short disk-like solid member having a stepped front surface including a leftwardly-facing annular vertical surface 23 immediately surrounding an inlet opening 24, an outwardly-facing horizontal cylindrical surface 25, and a leftwardly-facing annular vertical surface 26 extending radially outwardly therefrom. The body has an rightwardly-facing annular vertical rear surface 27. The outer margins of the front and rear surfaces 26, 27 are joined by a cylindrical surface 28. As best shown in FIG. 5, the body has a central horizontal axial through-bore which sequentially includes a horizontal cylindrical surface 29 extending rightwardly from the inner margin of left face surface 23, a leftwardly-facing annular vertical surface 30, a horizontal cylindrical surface 31 continuing rightwardly therefrom, a partially-spherically concave surface 32, and a frusto-conical surface 33 continuing rightwardly therefrom to join the inner margin of rear end face 27. An annular groove extends into the body from spherical surface 32 to receive and accommodate an O-ring 34, which sealingly and wipingly engages the spherical outer surface of valve member 22.

The body has four radially-extending openings that communicate body outer cylindrical surface 28 with body cavity surface 32. As best shown in FIG. 4, each of these openings has a radial axis arranged at a nominal interim centerline interval of 90°. Each opening has a stepped inner surface. An intermediate portion of the through-bores, indicated at 35, is internally threaded. A nozzle assembly, generally indicated at 36, is threaded into engagement with each through-bore. Each nozzle assembly has a radially-inward narrowed throat portion, and a outwardly-divergent exit section. In FIGS. 1–5, the several nozzle members are individually indicated by the letters A, B, C and D, and located at thrust direction reference angles of 180°, 270°, 0° and 90°, respectively. The body is also shown as having an outwardly-convergent entrance section, bounded by wall 38, communicating the spherical concave surface 32 with the narrowed throat section of each nozzle. Each of these entrance passages is an outlet passage that communicates the partially-spherical surface with an associated nozzle member.

As best shown in FIG. 5, the valve member 22 is shown as having a semi-spherical head portion 39 operatively arranged within the body spherical cavity. More particularly, this head portion has a spherical outer surface 40 arranged in closely-spaced facing engagement to body spherical concave surface 32, has a circular edge 41 at the juncture of spherical surface 40 with its annular left end face 42, has a flow-diverting projection 43 extending leftwardly from the central portion of its left end face, and has a lever portion 44 extending rightwardly from head portion 39 through frusto-conical passage 33 and terminating at an end which extends outwardly beyond the rear face of the body.

The intersection of valve member surfaces 40, 43 defines an edge 41 on the valve member. In the preferred embodiment, edge 41 is circular and lies in a common plane. However, in other forms, the edge may take different shapes and configurations as well. When the valve member is in its centered position relative to the body, as shown in solid in FIGS. 2 and 5, the valve member will partially occlude each of the outlet openings 38. Thus, valve member edge 41 constitutes a metering edge which separates an uncovered orifice through which fluid may flow from an occluded opening through which fluid may not flow.

Still referring principally to FIGS. 2 and 5, the invention further includes actuator means, generally indicated at 45, having two actuators arranged to act between the body and the distal marginal end portion of lever 44. A first of these actuators, generally indicated at 46, is arranged horizontally, and a second of these actuators, generally indicated at 48, is arranged vertically. Each actuator has a cylinder which is pivotally mounted on the body, and has an extensible rod portion which is connected to the rearward or distal marginal end of arm 44 by means of a clevis-type connection. Thus, these actuators are adapted to be selectively operated, either individually or in combination, to enable omni-directional pivotal movement of the valve member relative to the body. These actuators may be electro-hydraulic, electro-mechanical, or some other form. The salient feature here is that the two actuators are arranged to selectively move the distal end of lever 44 for causing controlled omni-directional pivotal movement of the vane member head portion 39 within the body.

Operation

Figures 6, 7:
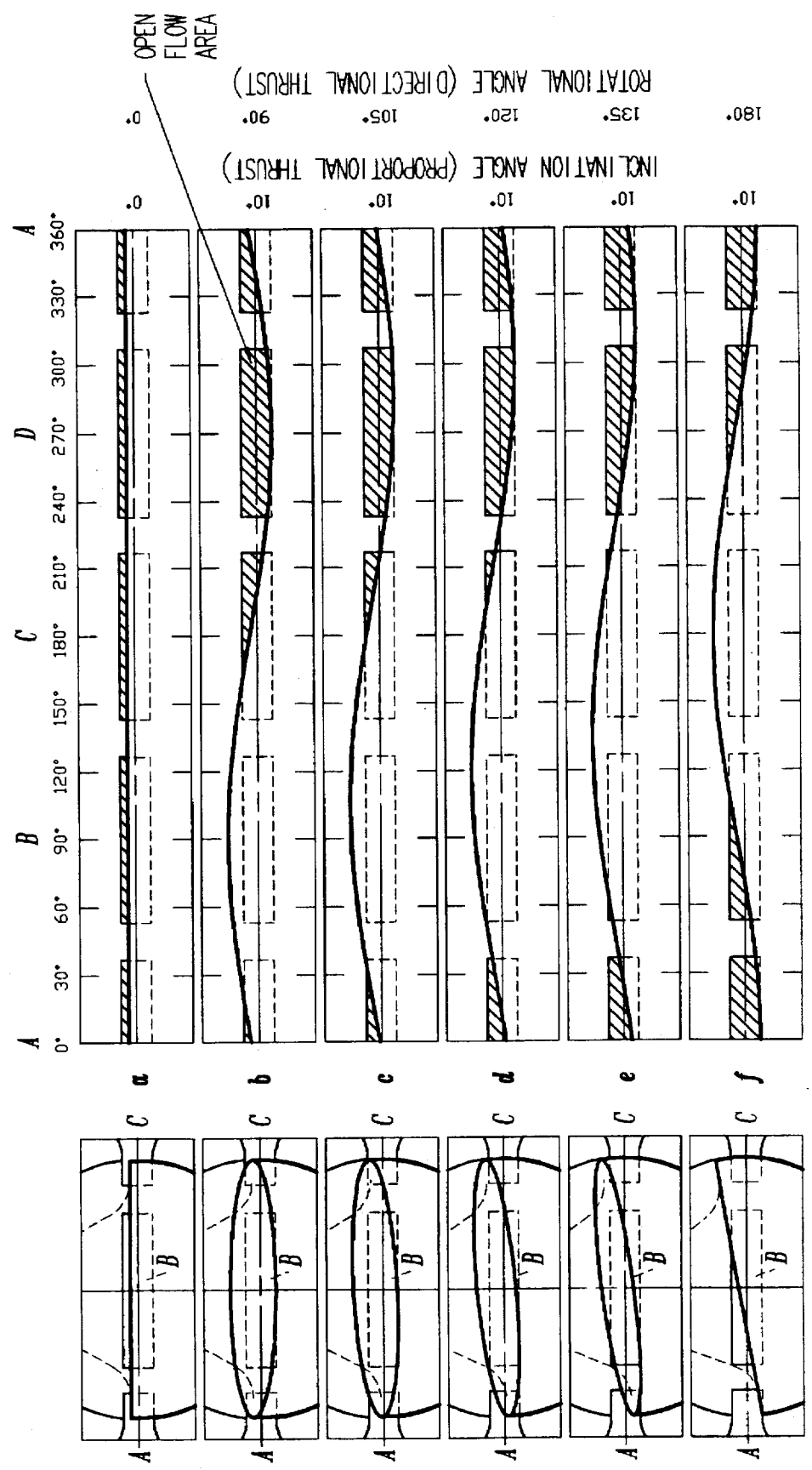
FIG. 6 is a schematic view showing the valve member as being in various angular positions relative to the body.
FIG. 7 is a schematic 360° panoramic view obtained by "unwrapping" and laying flat the orifices in the corresponding positions shown in FIG. 6, this view showing which ports are open and which ports are closed.

The operation of the improved valve is schematically illustrated in FIGS. 6 and 7.

FIG. 6 is a schematic view showing a portion of the valve assembly in different angular positions relative to the body. FIG. 6 depicts six views, and these are individually identified by the letters "a", "b", "c", "d", "e" and "f", respectively. FIG. 6 depicts valve member head portion 39 as being tilted to a maximum working range angle in a plane to fully open port "D", and then successively rotating the tilt plane about the valve axis to shift the maximum opening to port "A". The left port is indicated as being port "A", the right port is indicated as being port "C", and the visible port in the center is port "B". There is a port "D", although this is not seen in FIG. 6.

FIG. 7 is a panoramic view which is seen by unwrapping and laying flat the 360° peripheries of the valve members shown in FIG. 6. In effect, FIG. 7 displays in a mercator projection, the extent to which the several ports, labeled A, B, C, and D, are open or closed.

In FIG. 6(a), valve member 39 is shown as being in a centered position relative to the body, this being substantially the same as the position shown in FIG. 5. When in such centered position, each of the several ports is open to the same degree, and the degree of opening is represented by the shaded areas in FIG. 7(a).

FIGS. 6(b) and 7(b) depicted the situation when the valve member head portion is tilted by 10° to occlude port B, and to substantially open port D. In FIG. 7(b) port B is shown as being totally occluded, ports A and C are shown as being partially occluded, and port D is shown as being substantially open.

FIG. 6(c) shows the valve member head portion tilt plane as being rotated from the position shown in FIG. 6(b). In FIG. 6(c), the valve member head portion tilt plane has been rotated to further uncover port A, and to further cover port C, and the incremental difference of this movement is shown in FIG. 7(c).

FIG. 6(d) shows the valve member head portion tilt plane as having been further rotated so as to further uncover port A, and to further cover port C. The incremental difference of this is comparably illustrated in FIGS. 7(c) and 7(d).

FIG. 6(e) shows the valve member head portion tilt plane as having been further rotated by an incremental angle of about 15°. In this case, port A is further opened, the area of port D has decreased, and ports B and C have just begun to open, all is indicated in FIG. 7(e).

FIG. 6(f) illustrates the valve member head portion as having been tilted so as to partially uncover ports B and D, and to totally occlude port C. In this position, port A is substantially uncovered, as shown in FIG. 7(f).

Thus, by selectively controlling actuators 48 and 46, a joystick-like motion of the valve member may be obtained, with such omni-directional pivotal motion of the valve member head portion selectively uncovering the various ports.

In FIG. 6(a), each of the ports has an identical open orifice area. Hence, there is no net thrust through the valve, since all of the opposing jets are equally balanced. In FIG. 6(b), the net thrust is at 90°, attributable to the fact that port B is occluded, and port D is open.

In FIG. 6(c), the net thrust is shown as being at angle 105°. In FIG. 6(d), the net thrust is at angle 120°. In FIG. 6(e), the net thrust appears at angle 135°, and in FIG. 6(f), the net thrust occurs at angle 180°.

Therefore, the present invention broadly provides an improved hot gas control valve that is adapted to selectively apportion a hot gas flow, such as from a solid propellent gas generator, among a plurality of outlets communicating with rocket thruster nozzles. The improved valve includes a body having an inlet communicating with an internal cavity, the cavity being partially bounded by a partial-spherical concave surface, the body also having a plurality of outlet passages terminating in ports on the concave surface; and a valve member operatively arranged within the cavity for omni-directional pivotal movement there within. The valve member has a surface sealingly engaging the body concave surface and terminating in an edge. The edge cooperating with the ports to form variable-area metering orifices therebetween and being so configured and arranged as to vary the areas of the orifices as a function of the angular position of the valve member relative to the body such that the sum of the individual open areas of the metering orifices is substantially independent of valve member position over an operating range of valve member movement relative to the body.

Modifications

The present invention contemplates that many changes and modifications may be made. In the preferred embodiment, the body is shown as being a substantially unitary member, provided with four separable nozzle assemblies. Other forms and assemblies may be used in lieu of that shown. The invention is not necessarily limited to a four nozzle arrangement, as shown, and a greater or lesser number of such nozzles may alternatively be employed.

In the preferred embodiment, the valve member is mounted for omni-directional pivotal movement relative to the body, much in the nature of a joystick. The distal end of the valve member may be selectively moved by actuators 46, 48, or may be moved manually or by some other form of actuator or device. Similarly, the valve member may or may not have a flow deflector, such as indicated at 43.

The material of construction are not deemed to be particularly pertinent to the invention, and may be readily selected by a skilled designer, as desired.

Therefore, while a preferred form of the improved control valve has been shown and described, and certain modifications and changes thereof discussed, persons skilled in this art will readily appreciate that various additional changes and modifications may be made without departing from the spirit of the invention, as defined and differentiated by the following claims:

What is claimed is:

1. A control valve adapted to apportion a gas flow among a plurality of outlets, comprising:

a body having an inlet communicating with an internal cavity, said cavity being partially bounded by a partly-spherical concave surface, said body having a plurality of outlet passages terminating in ports at said concave surface;

a valve member operatively arranged within said cavity for omni-directional pivotal movement therewithin, said valve member having a surface sealingly engaging said body concave surface and terminating in an edge, said edge cooperating with said ports to form variable-area metering orifices therebetween and being so configured and arranged as to vary the areas of said orifices as a function of the angular position of said valve member relative to said body such that the sum of the individual open areas of said metering orifices is substantially constant and independent of valve member position over an operating range of valve member movement relative to said body.

2. A control valve as set forth in claim 1 wherein said ports have metering edges arranged in a common plane, and wherein said ports are circumferentially spaced from one another by equal interim distances.

3. A control valve as set forth in claim 2 wherein said common plane is perpendicular to a reference axis including the point about which said concave surface is generated.

4. A control valve as set forth in claim 2 wherein said ports are arranged in at least one cooperative pair, and wherein said ports are identical and are arranged at locations diametrically opposite one another.

5. A control valve as set forth in claim 4 wherein the sum of the open areas of said metering orifices of said cooperative pair remains substantially constant during said range of movement.

6. A control valve as set forth in claim 1 and further comprising actuator means acting between said body and at least one eccentric point on said valve member for selectively moving said valve member relative to said body.

7. A control valve as set forth in claim 6 wherein said actuator means includes a lever mounted fast to said valve member and extending outwardly therefrom, a first actuator operatively arranged to act between said body and lever for causing said valve member to have a component of rotation in a first plane relative to said body, and a second actuator operatively arranged to act between said body and lever for causing said valve member to have a component of rotation in a second plane relative to said body, and wherein said first and second planes are perpendicular to one another.

8. A control valve as set forth in claim 1 and further comprising a flow diverter mounted on said valve member and operatively arranged to divert flow from said inlet toward said metering ports.

9. A control valve as set forth in claim 1 wherein said valve member is semi-spherical.

10. A control valve as set forth in claim 1 wherein said valve member surface is partially-spherical and convex.

* * * * *